United States Patent
Wang et al.

(10) Patent No.: US 9,869,775 B2
(45) Date of Patent: Jan. 16, 2018

(54) METHOD FOR PROCESSING CERAMIC SCINTILLATOR ARRAY

(71) Applicants: Tsinghua University, Beijing (CN); Nuctech Company Limited, Beijing (CN)

(72) Inventors: Yanchun Wang, Beijing (CN); Qingjun Zhang, Beijing (CN); Yuanjing Li, Beijing (CN); Zhiqiang Chen, Beijing (CN); Ziran Zhao, Beijing (CN); Yinong Liu, Beijing (CN); Yaohong Liu, Beijing (CN); Jianping Chang, Beijing (CN); Wenjian Zhang, Beijing (CN); Shuqing Zhao, Beijing (CN); Xiang Zou, Beijing (CN); Yongqiang Wang, Beijing (CN)

(73) Assignees: Tsinghua University, Beijing (CN); Nuctech Company Limited, Beijing (CN)

( * ) Notice: Subject to any disclaimer, the term of this patent is extended or adjusted under 35 U.S.C. 154(b) by 90 days.

(21) Appl. No.: 14/983,411

(22) Filed: Dec. 29, 2015

(65) Prior Publication Data

US 2016/0187500 A1  Jun. 30, 2016

(30) Foreign Application Priority Data

Dec. 29, 2014 (CN) .......................... 2014 1 0831981

(51) Int. Cl.
*G01T 1/202* (2006.01)
*G01T 1/20* (2006.01)

(52) U.S. Cl.
CPC ................................ *G01T 1/2018* (2013.01)

(58) Field of Classification Search
CPC ..................................................... G01T 1/2018
See application file for complete search history.

(56) References Cited

U.S. PATENT DOCUMENTS 5,956,382 A * 9/1999 Wiener-Avnear ...... B23K 26/00
                                                                    250/367
6,133,614 A   10/2000 Shoji et al.
(Continued)

FOREIGN PATENT DOCUMENTS

CN    102129082 A    7/2011
CN    102176335 A    9/2011
(Continued)

OTHER PUBLICATIONS

Japanese Office Action dated Jul. 5, 2016, in related Application No. 2015-252928, and English language summary of relevance thereof; 4 pages.

(Continued)

*Primary Examiner* — Vishal I Patel
(74) *Attorney, Agent, or Firm* — Knobbe, Martens, Olson & Bear LLP

(57) ABSTRACT

A method for processing a ceramic scintillator array, characterized in that, comprising the following steps: (a) forming, in a first direction, a predetermined number of straight first-direction through-cuts which are parallel to each other and spaced from each other on a scintillator substrate by using laser; (b) adequately filling the first-direction through-cuts with an adhesive and solidifying the adhesive; (c) forming, in a second direction, a predetermined number of second direction through-cuts which are parallel to each other at a predetermined interval on the scintillator substrate by using laser, wherein the second direction is perpendicular (Continued)

(a) Top View of Linear Array (b) Top View of Area Array (c) Side View to the first direction; and (d) adequately filling the second direction through-cuts with the adhesive and solidifying the adhesive bond.

20 Claims, 4 Drawing Sheets

(56) References Cited

U.S. PATENT DOCUMENTS

| | | |
|---|---|---|
| 6,373,061 B1 | 4/2002 | Deutscher |
| 7,053,380 B2 | 5/2006 | Homma et al. |
| 7,244,907 B2 | 7/2007 | Hogan |
| 9,575,188 B2 | 2/2017 | Nitta |
| 2001/0013510 A1 | 8/2001 | Wiener-Avnear et al. |
| 2008/0179532 A1* | 7/2008 | Matsuda ............ C01F 17/0012 250/370.11 |
| 2015/0059963 A1* | 3/2015 | Nitta ........................ G01T 1/20 156/154 |

FOREIGN PATENT DOCUMENTS

| | | | |
|---|---|---|---|
| CN | 104204855 A | 12/2014 | |
| JP | H09-61534 A | 3/1997 | |
| JP | 2000-98041 A | 4/2000 | |
| JP | 2011-007575 A | 1/2011 | |
| KR | 20060032804 | 4/2006 | |
| WO | WO 2003/067282 A1 | 8/2003 | |
| WO | WO 2007/080535 A2 | 7/2007 | |
| WO | WO 2013/146304 A1 | 10/2013 | |
| WO | WO 2013146304 A1 * | 10/2013 | ............... G01T 1/20 |

OTHER PUBLICATIONS

Office Action dated Mar. 31, 2017 in Chinese Patent Application No. 2014108319814 (5 pgs), as well as concise English-language explanation thereof (1 pg); 6 pages total.

* cited by examiner (a) Top View of Linear Array (b) Top View of Area Array (c) Side View

METHOD FOR PROCESSING CERAMIC SCINTILLATOR ARRAY

CROSS-REFERENCE TO RELATED APPLICATION(S)

This application claims priority to Chinese Patent Application No. 201410831981.4, filed Dec. 29, 2014, published as CN 105798466 A, and entitled "Method for Processing Ceramic Scintillator Array", which is hereby incorporated by reference in its entirety.

BACKGROUND

Field

The present invention relates to a method for processing or fabricating a scintillator array, and more specifically to a method for fabricating, e.g., a gadolinium oxysulfide (GOS) ceramic scintillator array by using a laser cutting process and a diamond blade cutting process. The GOS scintillator array manufactured by the processing method of the present invention can be used in X-ray or γ-ray ionizing radiation imaging detectors for X-ray computed tomography (X-CT) and/or line-scan imaging, and is especially applicable to the field of radiation imaging security check.

Description of Related Information

A detector used in computed tomography (CT) scan system and line-scan X-ray detection system is constituted by a scintillator, a photodiode coupled with the scintillator, and a back-end electrical signal processing unit. In order to avoid crosstalk of optical signals detected by the photodiodes, the scintillator is usually processed into an array with a size corresponding to the size of a center of the photodiode, and an isolation layer that can reflect visible light is located between pixels of the array. Existing cutting or dividing techniques for scintillator array pixels generally use a circular diamond blade cutting process and/or a diamond wire sawing process. Generally, it is desirable that gaps between the pixels are narrow enough such that an effective volume of the respective pixel can be as large as possible and thereby detective quantum efficiency on ionizing radiation can be improved. However, the gap should not be too narrow. Otherwise, it is difficult to guarantee an enough thickness of the light-reflective material filled in the gap, which may cause incomplete shielding of scintillation (or luminescent) light and optical crosstalk among the pixels. Generally, there are large gaps between the pixels of the scintillator which are cut by the circular diamond blade. This is because the circular diamond blade should have a certain thickness to guarantee enough strength and it is difficult to reduce the blade oscillation resulted from the vibration of the cutting machine during its high-speed rotation to a low enough extent. The diamond wire sawing process can produce small gaps between the pixels of the scintillator. However, the diamond wire saw has a complicated structure, and its processing efficiency is low for small-batch and medium-batch processing. Furthermore, end surfaces produced by grinding of diamond abrasive particles are smooth and coolants used during cutting may remain on the end surfaces of cuts. If the residual coolants have not been thoroughly removed and an optical synthetic-resin cement comprising titanium dioxide light-reflective powder is filled into the narrow gaps, the strength of adhesion between the scintillator pixels and the synthetic-resin cement may not be large enough. Therefore, in this case, it is needed to pay more attention to subsequent coupling operations of the scintillator array in order to avoid fracture at the adhesive gap when the scintillator array is in a stressed state, which would increase the operation complexity.

In order to solve the above problems, there is a need for studying other cutting processes.

Laser cutting technique has become a proven industrial processing technique. In addition to laser cutting for metals, a new development may be made in laser cutting for ceramic. GOS ceramic scintillator is not fully transparent, and its light transmittance is not too high (for a thickness of 1.5 mm, its light transmittance is less than 50%). Therefore, the laser cutting technique can be applied to cut low light-transmittance objects, for example GOS ceramic scintillator array. Herein, the feature that "transmittance" or "light transmittance" is less than 50% indicates "transmittance for visible light wave band", and the used laser wavelength is associated with the transmittance. That is to say, for the wavelength of employed laser, the ceramic scintillator (an object to be processed) should have a low transmittance (i.e., a high absorbance), which is well known in the art of laser processing. Furthermore, the laser cutting process has a high processing speed, can easily adjust the widths of cuts, and can adjust the quality of cut (for example, surface roughness of the cut) by adjusting the pulse repetition frequency of laser and the moving speed of the working platform on which the scintillator is placed. Therefore, the laser cutting technique is a promising cutting process of GOS scintillator. However, there are several problems in the laser cutting for GOS scintillator. For example, hidden cracks may arise when a GOS scintillator is irradiated by laser beams of high energy. If a cut is not well protected during the cutting process, the cut will be blackened and thus loss of scintillation light on end surfaces of the cut will be increased, which will adversely affect light output of the scintillator. In addition, if the slags are not promptly removed from surfaces of the cuts, the cuts will be blocked, and the non-through cuts will affect the subsequent filling of the light-reflective synthetic-resin cement.

SUMMARY OF THE INVENTION

The present invention has been made in order to solve the problems described above. It is an object of the present invention to provide a method for processing ceramic scintillator arrays which combines a laser cutting process with a circular diamond blade cutting process. According to the present invention, it is possible to obtain a GOS ceramic scintillator array, for example, with a controlled cut-quality, a high qualified rate of product, and a low light transmittance.

In order to solve the above problems, the present invention provides a method for processing a ceramic scintillator array. The method comprises the following steps. In addition, the present invention is described by taking a GOS ceramic scintillator as an example of ceramic scintillator with a low light transmittance.

(1) The present invention employs ceramic scintillator with a low light transmittance (for example, GOS ceramic scintillator) prepared by means of a hot-pressing hot-isostatic-pressing two-step sintering process, a spark-plasma one-step sintering process, or a spark-plasma hot-isostatic-pressing two-step sintering process. The GOS ceramic material block is cut into scintillator substrates each of which has a certain thickness (for example, a thickness of 1-5 mm) by a circular diamond blade. The thickness of the GOS ceramic substrate can be determined based on the design of the detector. Optionally, one side surface of the cut substrate may be grinded.

(2) The GOS scintillator substrate is bonded and fixed to a ring-shaped fixture by using an adhesive which can be easily removed, and placed onto a working platform of the laser cutting system. However, the present invention is not limited to the adhesive. For example, the scintillator substrate may be fixed to the ring-shaped fixture by other means.

(3) A pulsed laser device of the laser cutting system is adjusted to form a light spot/melting spot on the GOS ceramic substrate (scintillator substrate) which has a required size. First, the frequency of the pulses of laser and the translational speed of the working platform are adjusted, such that a number of melting spots resulted from the pulses of laser can overlap with each other and thereby the GOS ceramic substrate is melted through at the overlapped spot. Subsequently, the melting spots resulted from the pulses of laser are moved by an appropriate distance and overlap with the edge of the previous overlapped spot (i.e., the previous spot at which the GOS ceramic substrate is melted through). Then, the GOS ceramic substrate is melted through at the new overlapped spot. The process is repeated in this way until a straight through-cut is formed. Furthermore, during the cutting process, high-pressure high-purity inert gas (for example, argon or nitrogen) is used to blow the slag away from the cuts. If the slags cannot be completely removed from the formed cut after the first-time cutting, the substrate may be cut a reciprocated manner for multiple times. The obtained cut has a natural color (light-yellow or gray-green) of the GOS ceramic material or a white color and is unsmooth. According to the designed size of the scintillator array, cuts are formed parallel to each other at an interval "a", and the direction of the cuts is defined as X direction.

(4) Adhesive tapes are bonded to the bottom surface of the GOS ceramic substrate which has been provided with the through-cuts. That is to say, the cuts are sealed on one side to form leak-proof grooves. A light-reflective epoxy resin cement comprising a light-reflective coating (i.e., a light-reflective cement) is poured into the grooves so that the light-reflective cement is adequately filled in the cuts. Therefore, a light reflecting layer is formed. Finally, the ceramic substrate is kept still and the light reflecting layer is solidified. Then, the tapes bonded to the bottom surface are removed.

(5) In the GOS ceramic substrate obtained in the step (4), which has been provided with the X-direction cuts filled with the light-reflective cement, a series of Y-direction cuts are cut in a laser cutting process (i.e., with the above laser cutting system), each of which has a width "b" equal to the size of the scintillator area array pixel, wherein the Y-direction cuts are perpendicular to the X-direction cuts. Therefore, scintillator linear arrays are formed, or alternatively an array in which each pixel has a Y-direction size "b" is formed. In a similar way to the step (4), the light-reflective cement is filled in the Y-direction cuts of the array and is solidified. After the light-reflective cement is solidified, the adhesive films on the bottom surface of the GOS scintillator array sheet are removed, and then the GOS ceramic array sheet having the light-reflective cement both in the X-direction cuts and the Y-direction cuts is obtained.

(6) Both end surfaces of the ceramic array sheet obtained in the step (5) are polished to have a finally required thickness of the scintillator array. A better one of the two end surfaces is selected as a surface for coupling with photodiodes. Additionally, in order to increase light output, the coupling surface may be polished.

(7) The scintillator array sheet obtained in the step (5) is bonded to a glass plate with rosin/paraffin. Then, the scintillator array sheet is cut, with a circular diamond blade, into narrow bars along the cuts formed by the laser cutting processes, wherein each bar has a certain number of rows (for example, 4 rows of scintillators). Therefore, a GOS scintillator area array applicable to detectors for CT object-scanning is obtained. If needed, linear arrays may be directly obtained when no light-reflective cement is filled in the Y-direction cuts in step (6). The scintillator array sheet is detached by heating and melting the rosin/paraffin.

(8) Contaminants (adhesive film and/or rosin/paraffin residue) remaining on the scintillator can be cleaned up with a cleaning agent (for example, one or more of acetone, carbon tetrachloride, trichloroethylene, and petroleum ether), so that the scintillator array which is clean and flat and has a regular size is obtained.

Optionally, the operation sequence of the step (6) and the step (7) can be exchanged.

According to the present invention, the reflecting layer of the scintillator array can have a required thickness. The present invention can solve the problem that hidden cracks arise when a GOS scintillator is irradiated by laser beams of high energy, without increasing optical absorption and loss of scintillation light on end surfaces of the cuts which adversely affects light output of the scintillator. Furthermore, the present invention can promptly remove slags from surfaces of cuts such that through-cuts can be formed without being blocked and subsequent filling of light-reflective synthetic-resin cement will not be adversely affected by the slags.

DESCRIPTION OF THE EMBODIMENTS

The present invention will be described below in detail with reference to the drawings.

Figure 1:
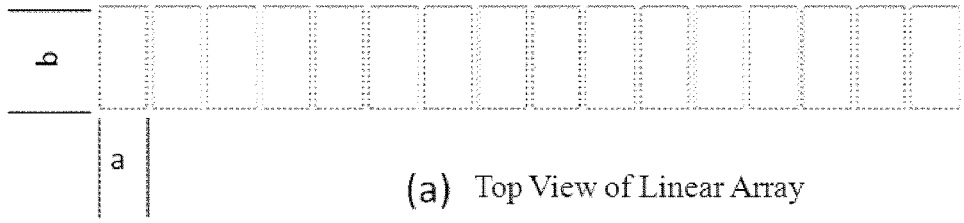
FIG. 1 is a schematic view of a design of a scintillator linear array and a scintillator 4-row area array, wherein (a) shows a top view of the linear array, (b) shows a top view of the area array, and (c) shows their side views.
Figure 1:
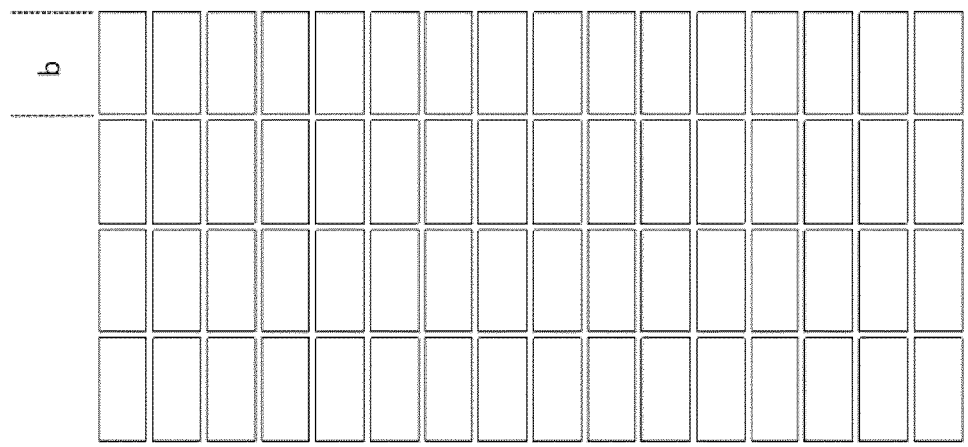
Figure 1:
Figure 2:
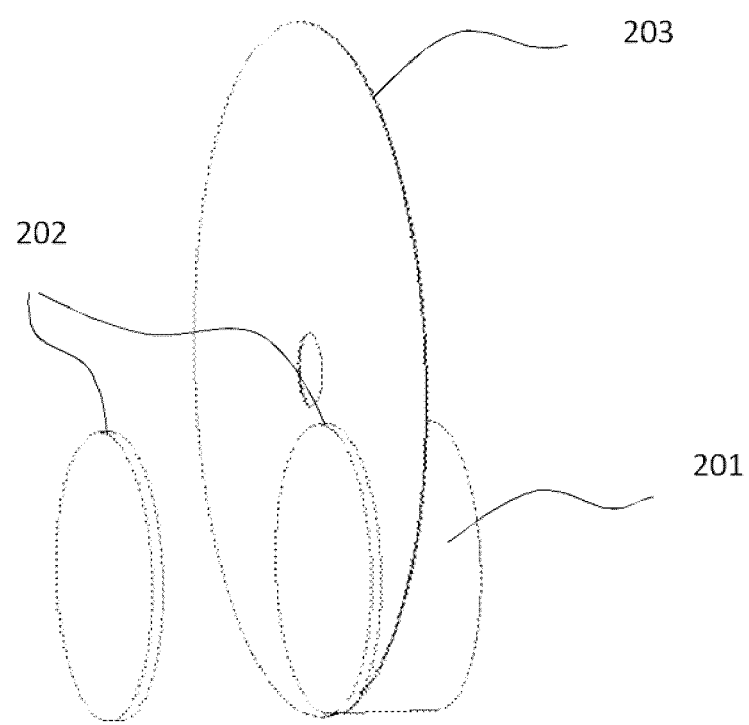
FIG. 2 shows a method for cutting a GOS ceramic scintillator block into GOS ceramic substrates by using a circular diamond blade.

The present invention employs GOS ceramic scintillators prepared for example by means of a hot-pressing hot-isostatic-pressing two-step sintering process or a spark-plasma hot-isostatic-pressing two-step sintering process. The GOS ceramic scintillator has a density over 99% of its theoretical density and a particle size between 100 µm and 100 µm. When the GOS ceramic scintillator is made with a thickness of 1 mm, its integrated transmittance is 25-50%. However, the present invention is not limited to the GOS ceramic scintillators made by the above processes, but can also employ GOS ceramic scintillators made by other processes (for example, a spark-plasma one-step sintering process and the like). Furthermore, in order to improve efficiency of manufacture by sintering, a thickness of an initial ceramic material block is generally several times a thickness of a scintillator for practical use. For example, a thickness of a block of ceramic scintillator initially obtained by sintering may be 10 mm, while a thickness of a scintillator array for practical use may be for example 1 mm. FIG. 1 is a schematic view of a design of a scintillator linear array and a scintillator 4-row area array, wherein (a) shows a top view of the linear array, (b) shows a top view of the area array, and (c) shows their side views. Therefore, the block of ceramic scintillator should be cut into slices, each of which has a thickness approximate to the thickness of the scintillator array. Furthermore, the present invention is described by taking GOS ceramic scintillator as an example. However, the present invention is not limited to the GOS ceramic scintillator, but can employ any other ceramic scintillator that has a low light transmittance and can be cut with laser. FIG. 2 shows its cutting method and particularly shows a method for cutting a GOS ceramic scintillator block into GOS ceramic substrates by using a circular diamond blade. For example, an ultrathin circular diamond blade is used to cut the GOS ceramic scintillator block from its cylindrical surface. The circular diamond blade may be made from diamond powder with specified particle size and metal by using an electroplating process or a sintering process. Furthermore, the circular diamond blade is used to perform cutting, since the GOS ceramic material block 201 can be easily clamped for cutting and it has a fast cutting speed. Moreover, since the sintered diamond blade 203 can grind the end surfaces of the ceramic slices, each obtained slice 202 has at least one relatively flat surface such that subsequent grinding steps may be omitted.

Figure 3:
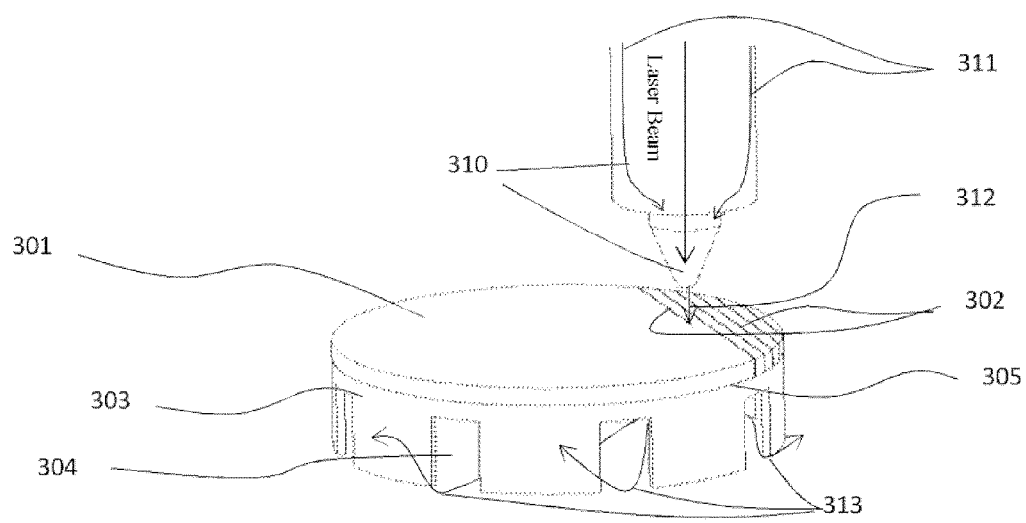
FIG. 3 shows a schematic view of a laser cutting process, which forms X-direction cuts.

Furthermore, the cut GOS scintillator substrate is washed with acetone, deionized water or absolute alcohol, dried and then fixed to a fixture for laser cutting. FIG. 3 shows a schematic view of a laser cutting process, which forms X-direction cuts. As shown in FIG. 3, reference numeral 301 denotes a GOS scintillator substrate. The GOS scintillator substrate 301 is bonded at its periphery to a ring-shaped laser cutting fixture 303 by using an adhesive 305 (such as rosin/wax mixture, α-cyanoacrylate and the like) which can be easily removed. However, the present invention is not limited to this. For example, the GOS scintillator substrate can be fixed to the laser cutting fixture by other means. A number of vent channels 304 are provided at the bottom of the laser cutting fixture 303 to discharge shielding gas. The shielding gas 312 carries the slag produced during the cutting of the GOS scintillator substrate away from the cuts 302 (first-direction through-cuts), and a portion of the shielding gas 313 passing through the cuts 302 is discharged via the vent channels 304 of the cutting fixture 303. A laser cutting head 310 is located above the GOS scintillator substrate, and shielding gas passages 311 are provided within the laser cutting head 310. A pulsed laser device of the laser cutting system is adjusted to form a light spot/melting spot on the GOS scintillator substrate 301 which has a size equal to a required cut width (that is to say, the size of light spot/melting spot may be adjusted according to practical requirements). First, the frequency of the pulses of laser and the translational speed of the working platform are adjusted, such that a number of melting spots resulted from the pulses of laser can overlap with each other and thereby the GOS scintillator substrate 301 is melted through at the overlapped spot. Subsequently, the melting spots resulted from the pulses of laser are moved in a certain distance (hereinafter, referred to as X-direction) by an appropriate distance (the distance should be smaller than the radius of the melting spot and may be set according to practical requirements) and overlap with the edge of the previous overlapped spot (i.e., the previous spot at which the GOS scintillator substrate is melted through). Then, the GOS scintillator substrate 301 is melted through at the new overlapped spot. The process is repeated in this way until a straight through-cut 302 is formed along the X-direction. If the slags cannot be completely removed from the formed cut after the first-time cutting, the substrate may be cut for multiple times until the slags are completely removed and a through-cut is formed. According to the designed size for cutting, cuts are formed parallel to each other at an interval "a". Furthermore, during the cutting process, high-pressure high-purity inert gas 311 (for example, argon or nitrogen) is ejected from the laser nozzle to form a high-pressure gas flow 312, which blows the slags away from the cuts to prevent the cuts from being blocked and/or prevent the end surfaces of the GOS ceramic material from being oxidized and blackened. The obtained cut 302 has a white color or a natural color (light-yellow or gray-green) of the GOS ceramic material and is unsmooth. It should be noted that the unsmooth end surface of the cut can increase the adhesive force of the light-reflective cement in the cuts and the adhesive strength. Moreover, the unsmooth end surface of the cut can increase diffuse reflection of light emitted from the scintillator pixels on the light reflecting layer, can increase the consistency of the light output from coupling surfaces of the scintillator pixels, and can decrease crosstalk of visible light among the scintillator pixels. It should be noted that the process for forming the cuts by using laser is not limited to the above-described embodiments. That is to say, various other processes can be used as long as they can form the required cuts.

Figure 4:
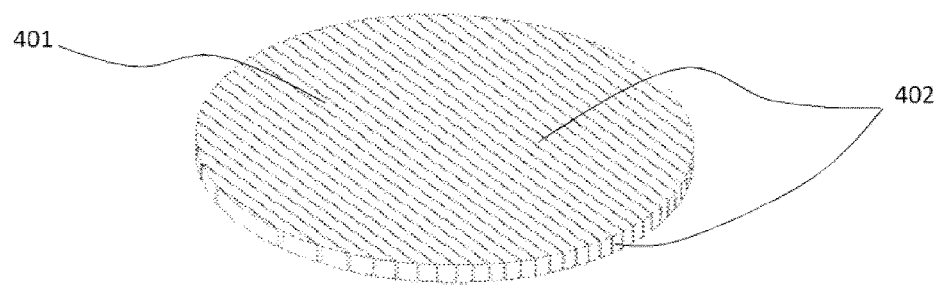
FIG. 4 shows a GOS scintillator array sheet having X-direction cuts in which a light-reflective cement is filled.

Subsequently, adhesive tapes are bonded to the bottom surface of the ceramic substrate (GOS scintillator substrate 301) which has been provided with the X-direction cuts. That is to say, the cuts are sealed on one side to form leakproof grooves. A light-reflective synthetic-resin cement (i.e., a light-reflective cement) made from a light-reflective coating (for example, glass microspheres, magnesia, zinc oxide, titanium oxide and the like, as described below) and a two-component epoxy resin (alternatively, acrylic or polyurethane can also be used) is poured into the grooves. Subsequently, the ceramic substrate filled with the synthetic-resin cement is placed in a vacuum drying oven, in which a vacuum pumping process is performed so that the air is evacuated from pores of the ceramic substrate and from the synthetic-resin cement. Then, air is refilled in the vacuum oven to bring the pressure to atmospheric pressure. The light-reflective synthetic-resin cement is refilled into the grooves such that the grooves are fully filled with the synthetic-resin cement. If necessary, the above steps may be repeated for multiple times so that the light-reflective synthetic-resin cement is adequately filled in the cuts. Finally, the ceramic substrate is kept still and the light-reflective synthetic-resin cement is solidified. Preferably, when the ceramic sheet is fixed by α-cyanoacrylate, it may be suitably heated to 80° C. such that the solidification process can be accelerated. Furthermore, the light-reflective synthetic-resin cement is not limited to the above-described adhesive, and various other adhesives may be used. Then, the ceramic substrate (GOS scintillator substrate 301) is detached from the laser cutting fixture 303. The tapes bonded to the bottom surface of the GOS scintillator substrate 301 (GOS scintillator array) are removed, and then the GOS scintillator substrate 301 (GOS ceramic array sheet) is washed with solvents (such as petroleum ether and/or acetone and ethyl alcohol). After that, both end surfaces of the whole array sheet are polished, and the excess light-reflective synthetic-resin cement is removed. FIG. 4 shows a GOS scintillator array sheet in which X-direction cuts are fixed by a synthetic-resin cement. Reference numeral 401 denotes a bar of GOS scintillator, and reference numeral 402 denotes cuts filled with a light-reflective synthetic-resin cement made from light-reflective powders and binding material. The light-reflective powders may be a granular material such as glass microspheres, magnesia, zinc oxide, titanium oxide and the like, and have a particle size indicated by a mesh number of less than 300. The titanium oxide powder is preferred, since the titanium oxide powder has an excellent light-shielding ability and a neutral ground color of pure white and has good dispersibilities in various resins. Furthermore, the particle size of the titanium oxide powder is approximate to the wavelength of light emitted from the GOS scintillator, so that the titanium oxide powder can scatter the light from the scintillator to a largest extent and thus avoid the crosstalk among the scintillator pixels. Furthermore, the optical binding material can be selected from various binding materials such as acrylic, polyurethane or epoxy. The optical binding material of two-component epoxy resin has a short curing time, a high adhesive strength, a good weather resistance and other advantageous, and thus the two-component epoxy resin is preferably selected as the binding material of the present invention. When an appropriate proportion of the binding liquid to the powder is achieved in the synthetic-resin cement, a compact reflecting layer with a large adhesive strength and a good light-shielding effect can be formed. The mass ratio of the two-component epoxy resin to the titanium oxide powder is 1:0.25~1:1.5.

Figure 5:
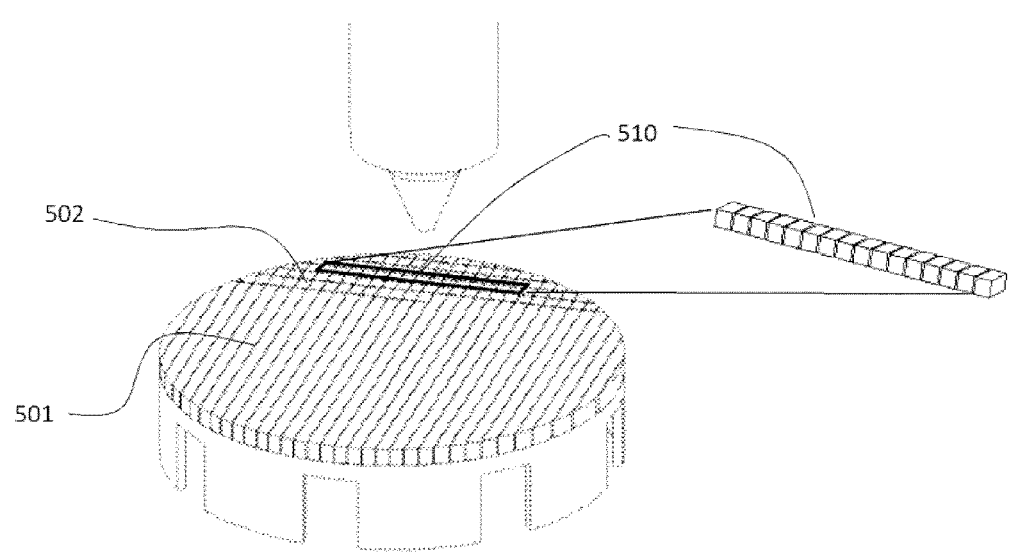
FIG. 5 shows a schematic view of a laser cutting process, which forms Y-direction cuts.
Figure 6:
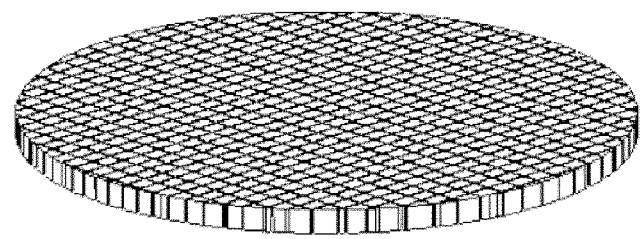
FIG. 6 shows a scintillator array sheet having both X-direction cuts and Y-direction cuts in which a light-reflective cement is filled.

FIG. 5 shows a schematic view of a laser cutting process, which forms Y-direction cuts. After the GOS scintillator array sheet which has been provided with the light-reflective cement along the X-direction is completely solidified, the GOS scintillator array sheet is cut into bars along a Y-direction in a laser cutting process, each of which has a width "b", wherein the Y-direction is perpendicular to the X-direction cuts 501. Therefore, scintillator linear arrays 501 each having a number of pixels are formed. Alternatively, a series of new parallel cuts 502 (second direction through-cuts) may be cut at an interval "b". After that, a scintillator area array having cuts with regular intervals in both the X-direction and the Y-direction can be directly obtained, wherein the X-direction cuts are filled with the reflecting layer and the Y-direction cuts keep empty. Then, in a similar way to processes for X-direction cuts, adhesive films (or tapes) are bonded to the bottom surface of the scintillator array sheet which has been provided with the Y-direction cuts 502, and the Y-direction cuts 502 are filled with a light-reflective synthetic-resin cement. After the synthetic-resin cement is solidified, the adhesive films on the bottom surface of the GOS scintillator array sheet are removed, and then the GOS ceramic array sheet is washed with solvents (such as petroleum ether and/or acetone and ethyl alcohol). After that, the GOS ceramic array sheet having the light-reflective cement both in the X-direction cuts and the Y-direction cuts is obtained. FIG. 6 shows a scintillator array sheet having both the X-direction cuts and Y-direction cuts in which the light-reflective cement is filled. The scintillator array sheet is polished and the excess light-reflective cement is removed. The scintillator array sheet is further polished to have a finally required thickness "d" of scintillator.

Figure 7:
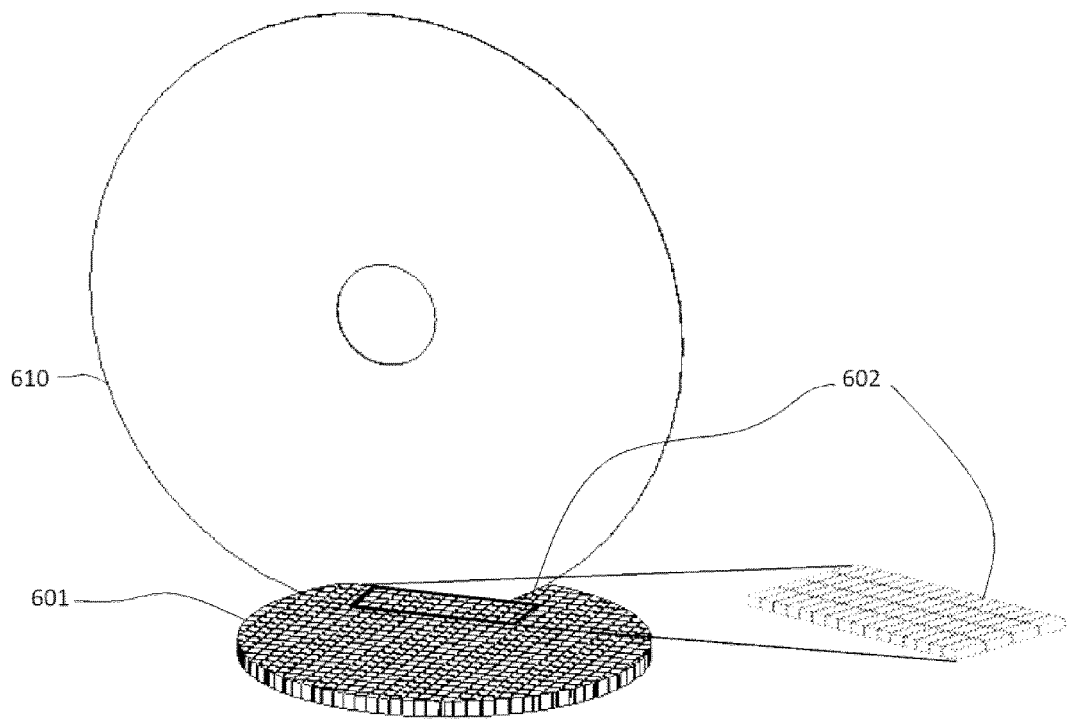
FIG. 7 shows a schematic view of the scintillator area array which is finally cut with a circular blade.

Furthermore, FIG. 7 shows a schematic view of the scintillator area array which is finally cut with a circular blade. FIG. 7 shows a cutting process in which the scintillator array is cut into a final pixel size. The scintillator array sheet 601 obtained in the above steps, which has both the X-direction cuts and the Y-direction cuts filled with the light-reflective cement, is bonded to a glass plate with rosin/paraffin. Then, the scintillator array sheet 601 is cut, with a circular diamond blade 610, into narrow bars along the cuts formed by the laser cutting processes, wherein each bar has a certain number of rows. Therefore, a GOS scintillator linear or area array 602 applicable to a detector for linear object-scanning is obtained. The scintillator array sheet is detached by heating and melting of the rosin/paraffin.

Furthermore, contaminants (adhesive film and/or rosin/paraffin residue) remaining on the scintillator can be cleaned up with a cleaning agent (for example, one or more of carbon tetrachloride, trichloroethylene, and petroleum ether), so that the scintillator array which is clean and flat and has a regular size is obtained.

Furthermore, the laser cutting system described in the above steps can use a pulsed laser device or a continuous laser device. Moreover, the repeated positioning accuracy of the working platform is up to or better than 0.01 mm.

Furthermore, the method of processing a gadolinium oxysulfide (GOS) ceramic scintillator array by using a laser cutting process and a diamond blade cutting process is described above. However, the present invention is not limited to this. The present invention can be applied to processing of various other ceramic scintillator arrays as long as the ceramic scintillator arrays have a low light transmittance and may be cut with laser.

While the present invention has been described with reference to exemplary embodiments thereof, it should be understood by those skilled in the art that various modifications, combinations, sub-combinations and alterations may occur within the spirit and scope of the invention insofar they are within the scope of the appended claims or the equivalents thereof.

What is claimed is:

1. A method for processing a ceramic scintillator array, comprising:
    (a) forming, in a first direction, a predetermined number of straight first-direction through-cuts which are parallel to each other and spaced from each other on a scintillator substrate by using a laser beam;
    (b) adequately filling the first-direction through-cuts with an adhesive and solidifying the adhesive;
    (c) forming, in a second direction, a predetermined number of second direction through-cuts which are parallel to each other at a predetermined interval on the scintillator substrate by using the laser beam, wherein the second direction is perpendicular to the first direction;
    (d) adequately filling the second direction through-cuts with the adhesive and solidifying the adhesive;
    (e) polishing both end surfaces of the scintillator substrate until the scintillator substrate has a required thickness; and
    (f) cutting the scintillator substrate, with a circular diamond blade, into narrow bars along the cuts formed by laser cutting process, wherein each narrow bar has a predetermined number of rows.

2. The method for processing a ceramic scintillator array according to claim 1, wherein the adhesive used in the step (b) and in the step (d) is a light-reflective cement.

3. The method for processing a ceramic scintillator array according to claim 1, wherein the scintillator substrate is obtained by cutting a block of ceramic scintillator into slices each having a predetermined thickness, wherein the block of ceramic scintillator is obtained by using one of a hot-pressing hot-isostatic-pressing two-step sintering process, a spark-plasma one-step sintering process and a spark-plasma hot-isostatic-pressing two-step sintering process.

4. The method for processing a ceramic scintillator array according to claim 1, wherein the step (a) comprises:
adjusting a laser device in a laser cutting system, forming melting spots each having a predetermined size on the scintillator substrate, overlapping a number of melting spots resulted from pulses of laser with each other by adjusting a frequency of the pulses of laser and a translational speed of a working platform such that the scintillator substrate is melted through at an overlapped spot;
moving the melting spots resulted from the pulses of laser in the first direction by an appropriate distance and overlapping the melting spots with an edge of a previous overlapped spot, such that the scintillator substrate is melted through at a new overlapped spot; and
repeating the process in this way until the straight first-direction through-cut is formed.

5. The method for processing a ceramic scintillator array according to claim 1, wherein the method further comprises, after the step (f), a step (g) of cleaning up contaminants remaining on the scintillator substrate by using a cleaning agent.

6. The method for processing a ceramic scintillator array according to claim 4, wherein the method further comprises, after the step (f), a step (g) of cleaning up contaminants remaining on the scintillator substrate by using a cleaning agent.

7. The method for processing a ceramic scintillator array according to claim 5, wherein the cleaning agent uses one or more of solvents comprising acetone, carbon tetrachloride, trichloroethylene, and petroleum ether.

8. The method for processing a ceramic scintillator array according to claim 6, wherein the cleaning agent uses one or more of solvents comprising acetone, carbon tetrachloride, trichloroethylene, and petroleum ether.

9. The method for processing a ceramic scintillator array according to claim 1, wherein the step (a) further comprises: blowing slags away from the cuts by using a high-pressure high-purity inert gas during formation of the first-direction through-cuts.

10. The method for processing a ceramic scintillator array according to claim 4, wherein the step (a) comprises: blowing slags away from the cuts by using a high-pressure high-purity inert gas during formation of the first-direction through-cuts.

11. The method for processing a ceramic scintillator array according to claim 1, wherein the step (b) comprises: bonding adhesive tapes to a bottom surface of the scintillator substrate which has been provided with the first-direction through-cuts, sealing the first-direction through-cuts on one side to form leakproof grooves, and pouring the light-reflective cement containing a light-reflective coating into the grooves so that the light-reflective cement is adequately filled in the first-direction through-cuts and is solidified.

12. The method for processing a ceramic scintillator array according to claim 4, wherein the step (b) comprises: bonding adhesive tapes to a bottom surface of the scintillator substrate which has been provided with the first-direction through-cuts, sealing the first-direction through-cuts on one side to form leakproof grooves, and pouring the light-reflective cement containing a light-reflective coating into the grooves so that the light-reflective cement is adequately filled in the first-direction through-cuts and is solidified.

13. The method for processing a ceramic scintillator array according to claim 1, wherein the step (e) comprises: polishing an end surface of the scintillator substrate which is selected as a coupling surface.

14. The method for processing a ceramic scintillator array according to claim 1, wherein the laser beam is emitted from one of a pulsed laser device and a continuous laser device.

15. The method for processing a ceramic scintillator array according to claim 8, wherein the step (b) comprises bonding adhesive tapes to a bottom surface of the scintillator substrate which has been provided with the first-direction through-cuts, sealing the first-direction through-cuts on one side to form leak-proof grooves, and pouring the light-reflective cement containing a light-reflective coating into the grooves so that the light-reflective cement is adequately filled in the first-direction through-cuts and is solidified.

16. The method for processing a ceramic scintillator array according to claim 15, wherein the scintillator substrate is obtained by cutting a block of ceramic scintillator into slices each having a predetermined thickness, wherein the block of ceramic scintillator is obtained by using one of a hot-pressing hot-isostatic-pressing two-step sintering process, a spark-plasma one-step sintering process and a spark-plasma hot-isostatic-pressing two-step sintering process.

17. The method for processing a ceramic scintillator array according to claim 16, wherein the step (e) comprises polishing an end surface of the scintillator substrate which is selected as a coupling surface.

18. The method for processing a ceramic scintillator array according to claim 17, wherein the laser beam is emitted from one of a pulsed laser device and a continuous laser device.

19. The method for processing a ceramic scintillator array according to claim 12, wherein the adhesive used in the step (b) and in the step (d) is a light-reflective cement.

20. The method for processing a ceramic scintillator array according to claim 19, wherein the scintillator substrate is obtained by cutting a block of ceramic scintillator into slices each having a predetermined thickness, wherein the block of ceramic scintillator is obtained by using one of a hot-pressing hot-isostatic-pressing two-step sintering process, a spark-plasma one-step sintering process and a spark-plasma hot-isostatic-pressing two-step sintering process.

* * * * *